(12) United States Patent  
Kanaya et al.

(10) Patent No.: US 8,064,023 B2  
(45) Date of Patent: Nov. 22, 2011

(54) DISPLAY APPARATUS

(75) Inventors: Yasuhiro Kanaya, Tokyo (JP); Daiki Nakajima, Shiga (JP); Yusuke Shimada, Kanagawa (JP); Hironao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 12/275,474

(22) Filed: Nov. 21, 2008

(65) Prior Publication Data

US 2009/0135357 A1    May 28, 2009

(30) Foreign Application Priority Data

Nov. 28, 2007   (JP) .................................. 2007-307435

(51) Int. Cl.  
*G02F 1/1333* (2006.01)

(52) U.S. Cl. ....................................................... 349/138

(58) Field of Classification Search .................. 349/141, 349/138, 153, 149, 139  
See application file for complete search history.

(56) References Cited

FOREIGN PATENT DOCUMENTS

| JP | 11-295764 | 10/1999 |
|---|---|---|
| JP | 2000-029045 A | 1/2000 |
| JP | 2004-158826 A | 6/2004 |
| JP | 2005-078946 A | 3/2005 |
| JP | 2008-083206 A | 4/2008 |
| JP | 2009-093058 A | 4/2009 |
| WO | 03/003108 A1 | 1/2003 |

OTHER PUBLICATIONS

Japanese Patent Office, Office Action issued in Patent Application JP 2007-307435, on Dec. 16, 2009.

*Primary Examiner* — Thoi Duong  
(74) *Attorney, Agent, or Firm* — SNR Denton US LLP

(57) ABSTRACT

The present invention provides a display apparatus in which destruction of an insulating film by water or water vapor and generation of air bubbles in the display apparatus can be suppressed. The display apparatus includes a display element having a display layer together with a pixel electrode and an opposite electrode, an insulating film in contact with an under face of the pixel electrode and a metal-containing film that contains a metal element, covers an end face of the insulating film, and covers a part of a top face and a part of an under face which continue to the end face of the insulating film.

9 Claims, 16 Drawing Sheets

DISPLAY APPARATUS

CROSS REFERENCE TO RELATED APPLICATIONS

The present invention contains subject matter related to Japanese Patent Application JP 2007-307435 filed in the Japanese Patent Office on Nov. 28, 2007, the entire contents of which being incorporated herein by reference.

BACKGROUND OF THE INVENTION

1. Field of the Invention

The present invention relates to a display apparatus such as a liquid crystal display.

2. Description of the Related Art

In the past, in a display apparatus such as a liquid crystal display, an insulting film made of silicon nitride (SiN), silicon oxide ($SiO_2$), or the like is provided in contact with an electrode, a wiring, and the like. In many cases, the insulting film is formed over a display region so as to extend to the outside of a seal layer (refer to, for example, Japanese Unexamined Patent Application Publication No. H11-295764, FIG. 6).

FIGS. 11 to 13 show an example of a display apparatus of related art having such an insulating film. The display apparatus is obtained by, for example, disposing a first substrate 210 and a second substrate 220 in parallel, adhering the peripheries with a seal layer 230, and providing a display layer 240 made of liquid crystal between the substrates 210 and 220.

The first substrate 210 is obtained by sequentially forming, on a glass substrate 211, a TFT 212, a protection film 213, a wiring 214, a peripheral wiring 215, a planarization film 216 made of an organic material, an opposite electrode 217, an insulating film 218 made of silicon nitride, and a pixel electrode 219. The protection film 213, the planarization film 216, and the insulating film 218 are formed on the entire surface of the glass substrate 211, and the seal layer 230 is provided on the insulating film 218.

In the same layer as the pixel electrode 219, a pixel-electrode-layer film 250 made of the material similar to the pixel electrode 219 is provided. The pixel-electrode-layer film 250 has the function of a dummy electrode for suppressing occurrence of burn-in and spot in the liquid crystal in the pixel periphery, and is electrically connected to the peripheral wiring 215 via the opposite electrode 217.

The second substrate 220 is obtained by sequentially forming a color filter 222, a peripheral light shield layer 223, and an overcoat layer 224 on a glass substrate 221.

SUMMARY OF THE INVENTION

The inventors of the present invention actually manufactured the structure shown in FIGS. 11 to 13 and recognized that the following advantages occur. In the structure, the insulating film 218 is formed so as to extend to the outside of the seal layer 230, and an end face 218A of the insulating film 218 is exposed to the outside of the display apparatus. Since silicon nitride as the material of the insulating film 218 does not easily absorb and transmit water, water tends to remain on the interface between the insulating film 218 and the seal layer 230 or the planarization film 216. Due to water vapor pressure generated when the water evaporates at high temperature, the seal layer 230 or the insulating film 218 under the seal layer 230 is destroyed or air bubbles are generated in the display apparatus.

To address the issue, the inventors of the present invention tried to set the end face 218A of the insulating film 218 on the inside of the seal layer 230 as shown in FIGS. 14 to 16. In this structure, destruction of the seal layer 230 or the insulating film 218 under the seal layer 230 is suppressed. However, water passed through the planarization film 216 made of an organic material concentrates on an interface 218B between the planarization film 216 and the insulating film 218 and evaporates at high temperature. Thereby, the pressure becomes high, and air bubbles of water vapor are generated in the display apparatus.

It is therefore desirable to provide a display apparatus capable of suppressing destruction of an insulating film and generation of air bubbles in the display apparatus due to water or water vapor.

According to an embodiment of the present invention, there is provided a display apparatus including: a display element having a display layer together with a pixel electrode and an opposite electrode; an insulating film in contact with an under face of the pixel electrode; and a metal-containing film that contains a metal element, covers an end face of the insulating film, and also covers a part of a top face and a part of an under face which continue to the end face of the insulating film.

In the display apparatus of the embodiment of the present invention, an end face of the insulating film and a part of the top face and a part of the under face continuing to the end face are covered with a metal-containing film which contains a metal element. By the metal-containing film, transmission of water to the interface between the insulting film and another film is suppressed, and concentration of water to the interface is reduced. Therefore, generation and concentration of water vapor pressure in the interface is suppressed at the time of warming, and destruction of the insulating film and generation of air bubbles in the display apparatus is suppressed.

In the display apparatus of the embodiment of the present invention, an end face of the insulating film and a part of the top face and a part of the under face continuing to the end face are covered with a metal-containing film which contains a metal element. Thus, destruction of the insulating film and generation of air bubbles in the display apparatus due to water or water vapor may be suppressed.

Other and further objects, features and advantages of the invention will appear more fully from the following description.

DETAILED DESCRIPTION OF THE PREFERRED EMBODIMENTS

Embodiments of the present invention will be described in detail hereinbelow with reference to the drawings.

First Embodiment

Figure 1:
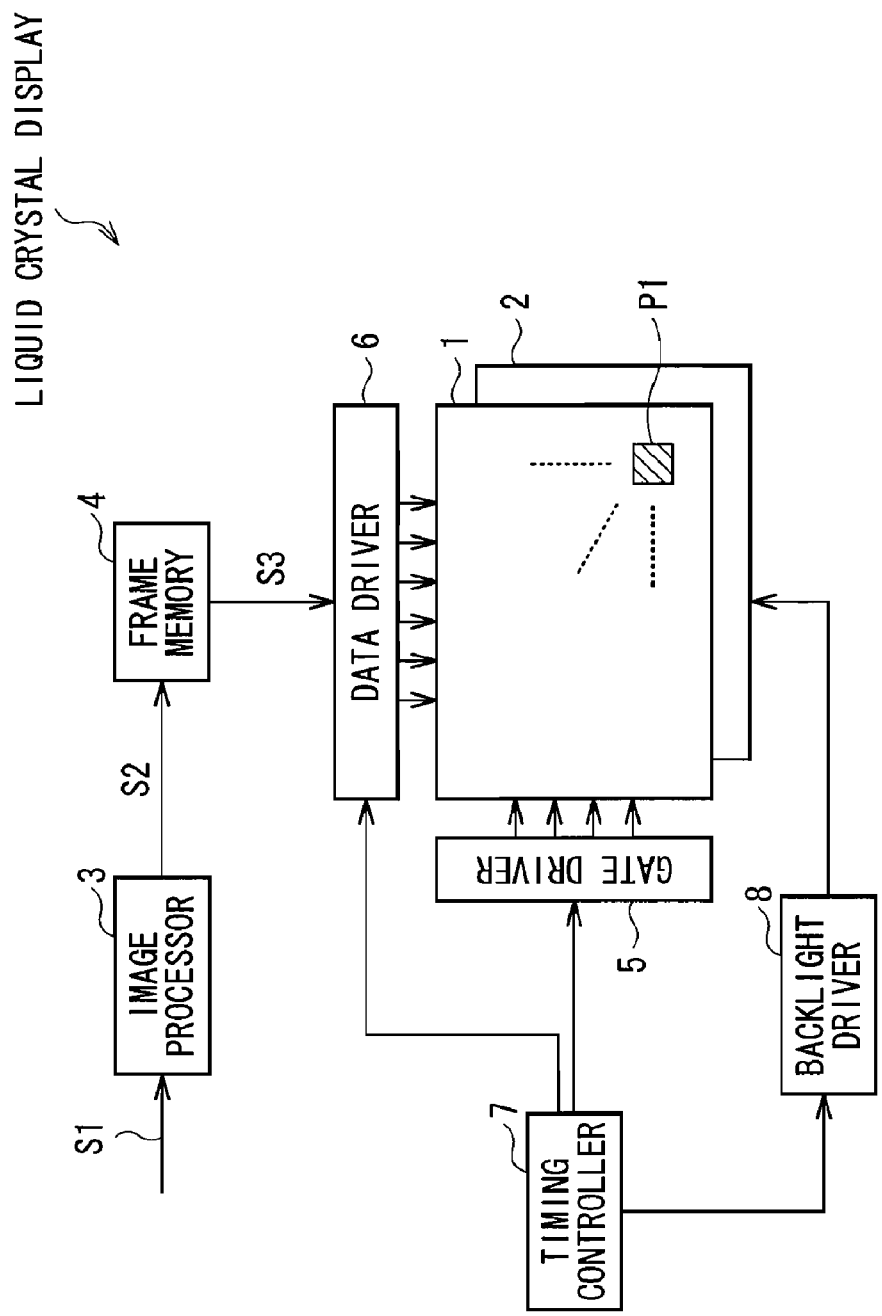
FIG. 1 is a diagram showing a whole configuration of a display apparatus in a first embodiment of the present invention.

FIG. 1 shows the configuration of a display apparatus as a first embodiment of the present invention. The display apparatus is an intermediate-sized or large-sized display apparatus such as a liquid crystal television, or a liquid crystal display for use in a mobile device such as a cellular phone or a game device. The display apparatus has, for example, a liquid crystal display panel 1, a backlight 2, an image processor 3, a frame memory 4, a gate driver 5, a data driver 6, a timing controller 7, and a backlight driver 8.

The liquid crystal display panel 1 displays a video image on the basis of a video signal Di transmitted from the data driver 6 by a drive signal supplied from the gate driver 5. The liquid crystal display panel 1 is an active-matrix-type liquid crystal display panel having a plurality of pixels P1 arranged in a matrix and driven pixel P1 by pixel P1. The backlight 2 is a light source for emitting light to the liquid crystal display panel 1 and includes, for example, a CCFL (Cold Cathode Fluorescent Lamp), an LED (Light Emitting Diode), and the like. The image processor 3 performs a predetermined image process on a video signal S1 from the outside and generates a video signal S2 as an RGB signal. The frame memory 4 stores the video signal S2 supplied from the image processor 3 on the frame unit basis pixel P by pixel P. The timing controller 7 controls drive timings of the gate driver 5, the data driver 6, and the backlight driver 8. The backlight driver 8 controls lighting operation of the backlight 2 in accordance with the timing control of the timing controller 7.

Figure 2:
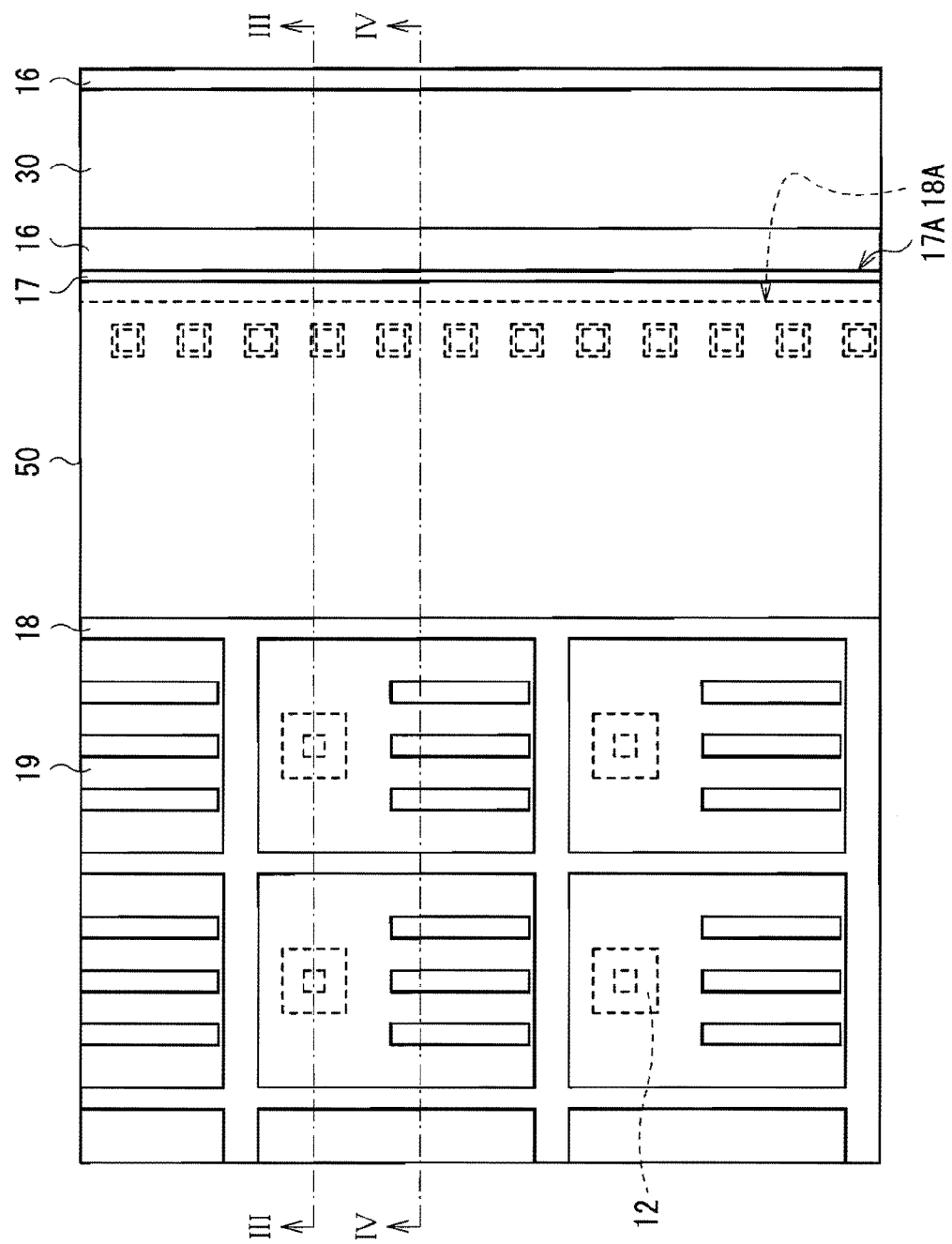
FIG. 2 is a plan view showing the configuration of a liquid crystal display panel in FIG. 1.
Figure 3:
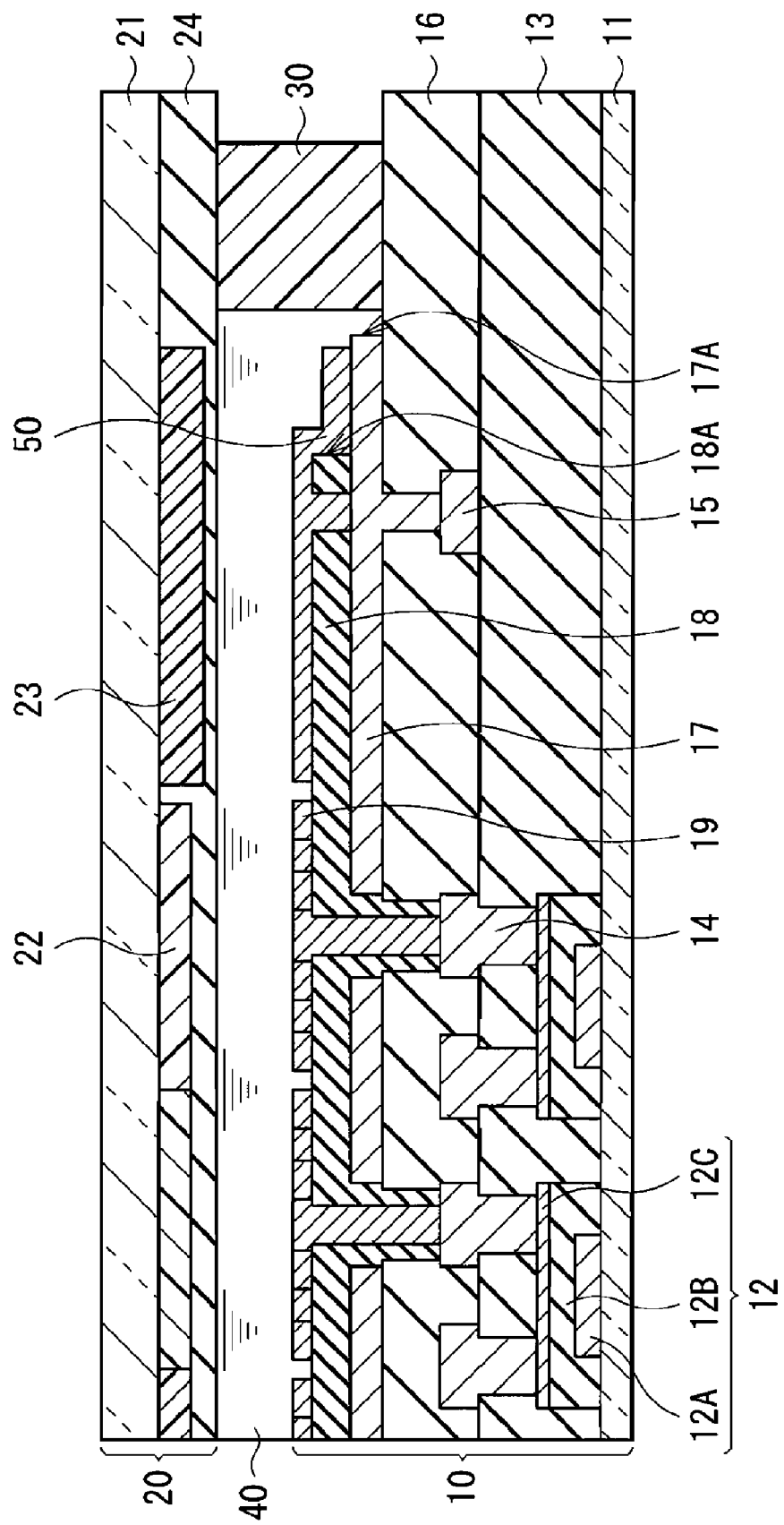
FIG. 3 is a cross section view showing the configuration taken along line III-III in FIG. 2.
Figure 4:
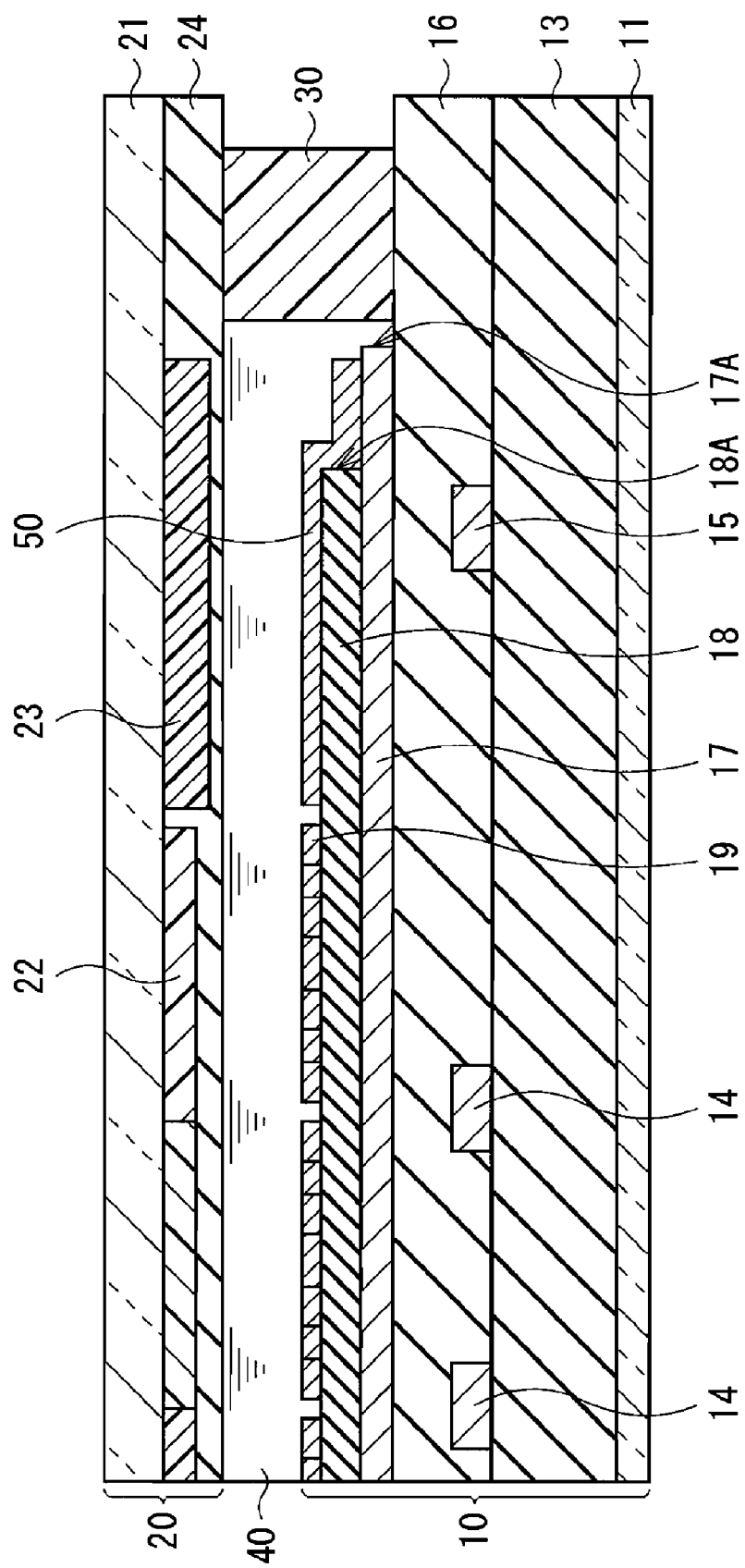
FIG. 4 is a cross section view showing the configuration taken along line IV-IV in FIG. 2.

FIG. 2 shows a plan configuration of a portion around an end of the liquid crystal display panel 1. FIG. 3 shows a sectional structure taken along line III-III of FIG. 2, and FIG. 4 shows a sectional structure taken along line IV-IV. The liquid crystal display panel 1 is obtained by disposing a first substrate 10 and a second substrate 20 in parallel, adhering the peripheries with a seal layer 30 made of ultraviolet curable resin or thermoset resin, and having therein a display layer 40 made of liquid crystal.

The first substrate 10 is obtained by, for example, forming a TFT 12, a protection film 13, a wiring 14 and a peripheral wiring 15, a planarization film 16, an opposite electrode 17, an insulating film 18, and a pixel electrode 19 in order on a glass substrate 11.

The TFT 12 has, for example, a gate electrode 12A made of molybdenum (Mo), a gate insulating film 12B made of silicon nitride, and a semiconductor layer 12C including an a–Si layer as an active layer and an n+a–Si layer as a source region/drain region.

The protection film 13 is made of, for example, silicon nitride and is formed on the entire surface of the glass substrate 11.

The wiring 14 and the peripheral wiring 15 have a configuration that, for example, an aluminum (Al) layer and a molybdenum (Mo) layer are stacked. The wiring 14 has the function of a signal wiring and is electrically connected to the source region/drain region in the semiconductor layer 12C of the TFT 12 via a contact hole formed in the protection layer 13. The peripheral wiring 15 is an electrode line electrically connected to the opposite electrode 17 via a contact hole formed in the planarization film 16.

The planarization film 16 is provided for uniformizing gaps for providing the display layer 40 made of liquid crystal. In a manner similar to the protection film 13, the planarization film 16 is formed over the entire surface of the glass substrate 11. The seal layer 30 is provided on the planarization film 16. The planarization film 16 is made of an organic material such as acrylic. Consequently, the planarization film 16 transmits and absorbs water relatively easily.

The opposite electrode 17 and the pixel electrode 19 are transparent for passing light from the backlight 2 and contain a metal element to have the function of electrodes. Concretely, the opposite electrode 17 and the pixel electrode 19 are made of indium oxide and tin oxide and contain indium and tin as metal elements.

The insulating film 18 is provided to set the potential between the opposite electrode 17 and the pixel electrode 19 as an electric field to be applied to the liquid crystal of the display layer 40. The insulating film 18 is provided between the pixel electrode 19 and the opposite electrode 17 and is in contact with the under face of the pixel electrode 19 and the top face of the opposite electrode 17. The insulating film 18 is made of, for example, silicon nitride and is a film which does not easily absorb and transmit water.

Preferably, an end face 18A of the insulating film 18 is positioned on the inside of the seal layer 30. With the configuration, water does not accumulate on the interface between the insulating film 18 made of silicon nitride which does not easily absorb and transmit water and the seal layer 30 made of an organic material which easily absorbs and transmits water. The possibility that the seal layer 30 or the insulating film 18 under the seal layer 30 is destroyed by water vapor pressure when the water evaporates at high temperature is eliminated.

The end face 18A of the insulating film 18 and a part of the top face thereof continuing to the end face 18A are covered with a pixel-electrode-layer film 50 formed in the same layer as the pixel electrode 19. The pixel-electrode-layer film 50 is, for example, made of the same material as the pixel electrode 19, that is, indium oxide and tin oxide and contains indium and tin as metal elements. The end face 18A of the insulating film 18 is positioned inside an end face 17A of the opposite electrode 17. A part of the under face of the insulating film 18 continuing to the end face 18A is covered with the opposite electrode 17 containing indium and tin as metal elements. With the configuration, in the display apparatus, destruction of the insulating film 18 and generation of air bubbles in the display apparatus by water or water vapor can be suppressed.

Preferably, the part covering the top face of the insulting film 18, of the pixel-electrode-layer film 50 has a length of 100 nm or more from the end face 18A of the insulating film 18. Similarly, the part covering the under face of the insulating film 18, of the opposite electrode 17 has preferably a length of 100 nm or more from the end face 18A of the insulating film 18. Since the opposite electrode 17 and the pixel-electrode-layer film 50 are thin films, if the covering part has a length of 100 nm or more, the end face 18A of the insulting film 18 is covered reliably.

Preferably, the pixel-electrode-layer film 50 is electrically connected to the peripheral wiring 15 via the opposite electrode 17. The pixel-electrode-layer film 50 is therefore provided with the function of a dummy pixel for suppressing occurrence of burn-in or spot due to a contaminant such as ion in the liquid crystal in a pixel at the outermost periphery.

Figure 5:
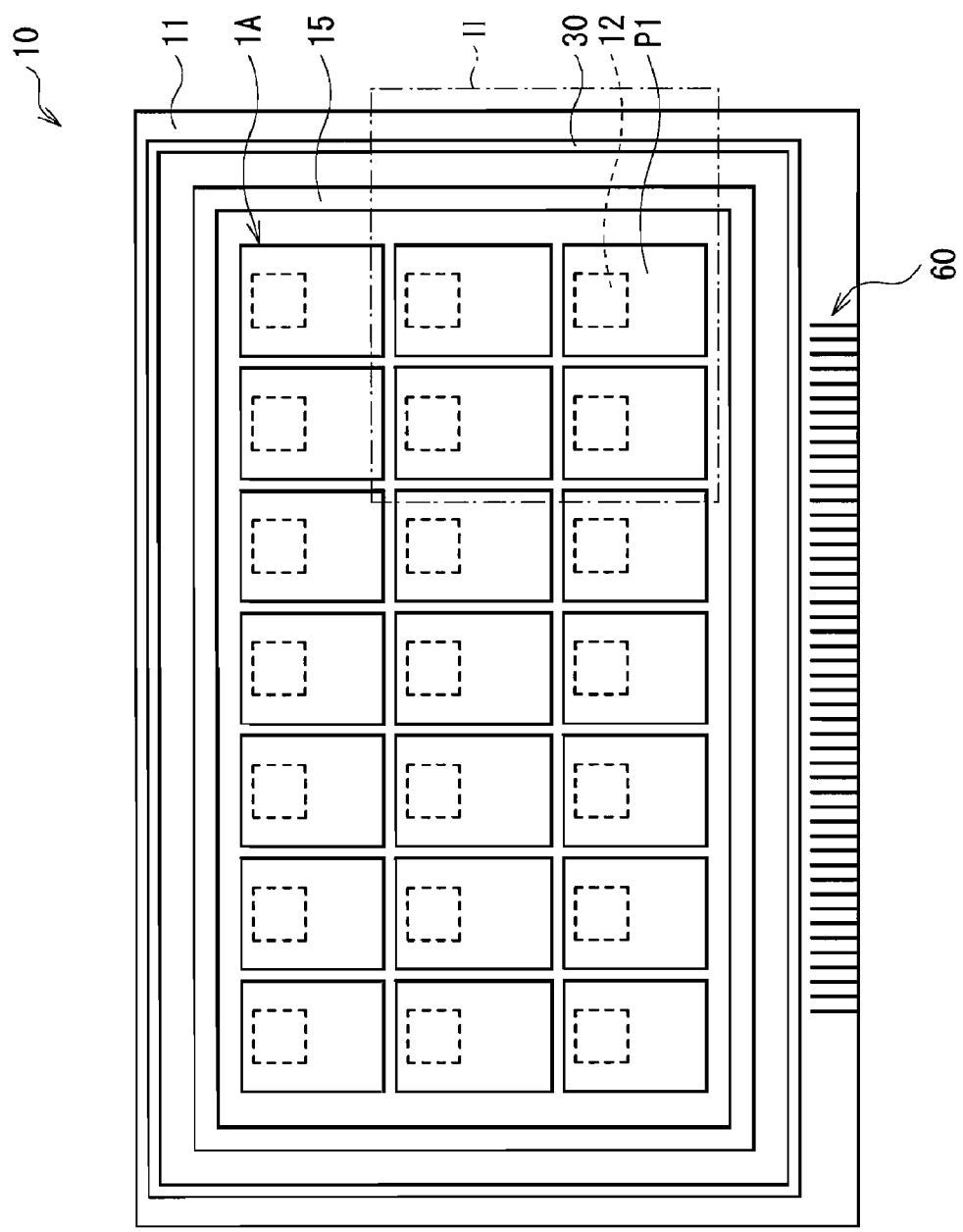
FIG. 5 is a plan view showing a whole configuration of a first substrate illustrated in FIG. 3.

FIG. 5 shows a plan configuration of the entire first substrate 10. A display area 1A in which a plurality of pixels P1 are disposed in a matrix is provided in the center of the first substrate 10. The seal layer 30 is provided on the outside of the display area 1A so as to surround the display area 1A. The peripheral wiring 15 is provided between the display area 1A and the seal layer 30. A terminal 60 for electric connection to the gate driver 5 or the data driver 6 is disposed on one side of the first substrate 10. Although not shown in FIG. 2, the terminal 60 penetrates the seal layer 30 and is connected to the wiring 14 or the peripheral wiring 15.

The second substrate 20 is obtained by sequentially forming a color filter 22, a peripheral light shield layer 23, and an overcoat layer 24 on a glass substrate 21. The color filter 22 is made of a resin in which a pigment is mixed. By selecting a pigment, the light transmission is adjusted to be high in a wavelength region of red, green, or blue as a target color and to be low in the other wavelength regions. The peripheral light shield layer 23 is made of, for example, a resin containing a black pigment. The overcoat layer 24 is provided to planarize the surface of the glass substrate 21 on which the color filter 22 and the peripheral light shield layer 23 are formed and is made of, for example, a resin.

The display apparatus may be manufactured by, for example, as follows.

First, the gate electrode 12A made of the above-described material is formed on the glass substrate 11, and the gate insulating film 12B and the semiconductor layer 12C made of the above-described material are formed by, for example, plasma CVD. By performing the process using etching to form a channel shape, the TFT 12 is formed.

Next, the protection film 13 made of the above-described material is formed on the TFT 12, and a contact hole is formed in the protection film 13. Subsequently, the wiring 14 and the peripheral wiring 15 made of the above-described material are formed, and the wiring 14 is connected to the TFT 12 via the contact hole.

After that, the planarization film 16 made of the above-described material is formed on the wiring 14 and the peripheral wiring 15, and the opposite electrode 17 made of the above-described material is formed on the planarization film 16.

After formation of the opposite electrode 17, the insulating film 18 made of the above-described material is formed by, for example, plasma CVD. The end face 18A of the insulating film 18 is set to be on the inside of the end face of the opposite electrode 17 by, for example, etching. A part of the under face of the insulating film 18 continuing to the end face 18A is covered with the opposite electrode 17.

After formation of the insulating film 18, the pixel electrode 19 made of the above-described material is formed. At that time, the pixel-electrode-layer film 50 made of the same material as that of the pixel electrode 19 is formed in the same layer as the pixel electrode 19. The end face 18A of the insulating film 18 and a part of the top face thereof continuing to the end face 18A are covered with the pixel-electrode-layer film 50. As a result, the first substrate 10 is formed.

The color filter 22 and the peripheral shield layer 23 are formed on the glass substrate 21 and are covered with the overcoat layer 24, thereby forming the second substrate 20.

After the first and second substrates 10 and 20 are formed, the seal layer 30 is formed at the periphery of the first substrate 10. The first and second substrates 10 and 20 are adhered to each other with the seal layer 30 therebetween, and liquid crystal is injected to the inside, thereby forming the display layer 40. As a result, the display apparatus shown in FIGS. 1 to 5 is completed.

In the display apparatus, as shown in FIG. 1, a video signal S1 supplied from the outside is subjected to image process in the image processor 3, thereby generating a video signal S2 for pixels P1. The video signal S2 is stored in the frame memory 4 and supplied as a video signal S3 to the data driver 6. Based on the video signal S3 supplied in such a manner, the line-sequential display drive operation is performed on the pixel P1 unit basis. Illumination light from the backlight 2 is modulated by the liquid crystal display panel 1 and the resultant light is output as display light.

In the embodiment, the end face 18A of the insulating film 18 and a part of the top face thereof continuing to the end face 18A are covered with the pixel-electrode-layer film 50, and a part of the under face of the insulating film 18 continuing to the end face 18A is covered with the opposite electrode 17. That is, transmission of the water in the interface between the insulating film 18 and the planarization film 16 is suppressed by the pixel-electrode-layer film 50 and the opposite electrode 17 containing metal elements, so that concentration of water to the interface is reduced. Therefore, generation and concentration of water vapor pressure in the interface is suppressed at the time of warming, and destruction of the insulating film 18 and generation of air bubbles in the display apparatus is suppressed.

As described above, in the embodiment, the end face 18A of the insulating film 18 and a part of the top face thereof continuing to the end face 18A are covered with the pixel-electrode-layer film 50, and a part of the under face of the insulating film 18 continuing to the end face 18A is covered with the opposite electrode 17. Therefore, destruction of the insulating film 18 and generation of air bubbles in the display apparatus by water or water vapor can be suppressed.

In the foregoing embodiment, the case where the pixel-electrode-layer film 50 and the pixel electrode 19 are made of the same material has been described. The pixel-electrode-layer film 50 does not have to be always made of the same material as that of the pixel electrode 19 but may be made of another material as long as the material contains a metal element. The opposite electrode 17 may also contain another metal element. A metal element contained in the pixel-electrode-layer film 50 or the opposite electrode 17 is at least one element selected from the group consisting of indium, tin, zinc, aluminum, molybdenum, titanium, tungsten, chromium, tantalum, and silver, for example.

Second Embodiment

Figure 6:
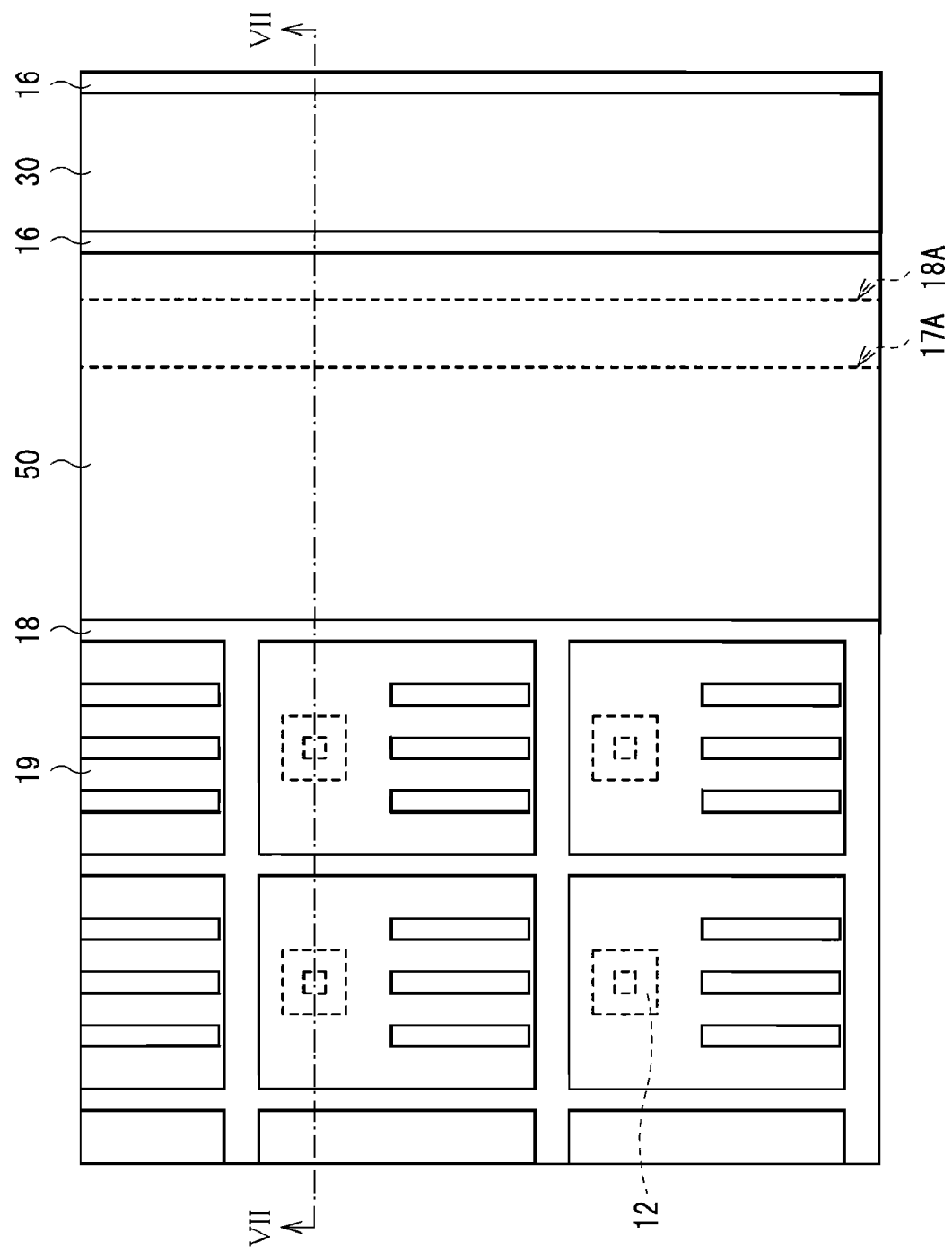
FIG. 6 is a plan view showing the configuration of a liquid crystal display panel in a second embodiment of the invention.
Figure 7:
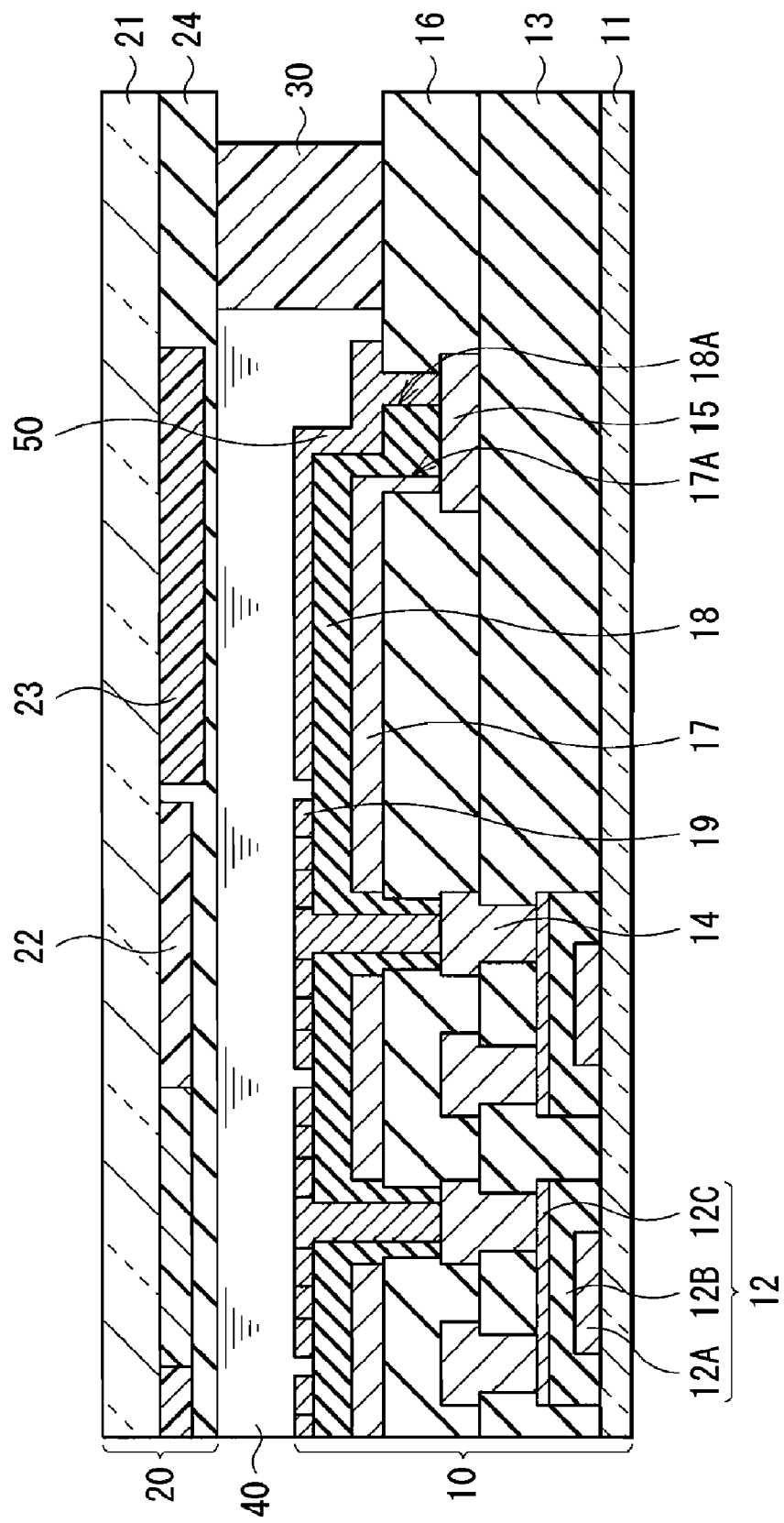
FIG. 7 is a cross section view showing the configuration taken along line VII-VII in FIG. 6.

FIG. 6 shows a plan configuration of a portion around an end of the liquid crystal display panel 1 as a second embodiment of the invention. FIG. 7 shows a sectional structure along line VII-VII of FIG. 6. The liquid crystal display panel 1 has a configuration similar to that of the first embodiment except that the end face 18A of the insulating film 18 lies on the peripheral wiring 15, and a part of the under face of the insulating film 18 continuing to the end face 18A is covered with the peripheral wiring 15. Therefore, the same reference numerals are designated to corresponding elements.

The glass substrate 11, the TFT 12, the protection film 13, the wiring 14 and the peripheral wiring 15, the planarization film 16, and the pixel electrode 19 are formed in a manner similar to the first embodiment.

The end face 18A of the insulating film 18 and a part of the top face thereof continuing to the end face 18A are covered with the pixel-electrode-layer film 50 in a manner similar to the first embodiment. The end face 18A is positioned on the peripheral wiring 15, and a part of the under face of the insulating film 18 continuing to the end face 18A is covered with the peripheral wiring 15. The peripheral wiring 15 has a configuration in which, for example, an aluminum (Al) layer and a molybdenum (Mo) layer are stacked and contains, as metal elements, aluminum and molybdenum. With the configuration, in the display apparatus, in a manner similar to the first embodiment, destruction of the insulating film 18 and generation of air bubbles in the display apparatus by water or water vapor can be suppressed.

Preferably, the part covering the under face of the insulting film 18, of the peripheral wiring 15 has a length of 100 nm or more from the end face 18A of the insulating film 18 in a manner similar to the first embodiment.

An end of the opposite electrode 17 is connected to the peripheral wiring 15 but is not connected to the pixel-electrode-layer film 50 and the pixel electrode 19.

The liquid crystal display panel 1 may be manufactured in a manner similar to the first embodiment except that the end face 18A of the insulating film 18 is formed on the peripheral wiring 15. The effect of the embodiment is similar to that of the first embodiment.

The embodiment has an effect similar to that of the first embodiment and, in addition, is effective particularly in the case where adhesion between the pixel-electrode-layer film 50 and the opposite electrode 17 is insufficient.

In the foregoing embodiment, the case where the peripheral wiring 15 contains aluminum and molybdenum as metal elements has been described. The peripheral wiring 15 may contain another metal element. The pixel-electrode-layer film 50 may also contain another metal element. A metal element contained in the peripheral wiring 15 or the pixel-electrode-layer film 50 is at least one element selected from the group consisting of indium, tin, zinc, aluminum, molybdenum, titanium, tungsten, chromium, tantalum, and silver, for example.

Third Embodiment

Figure 8:
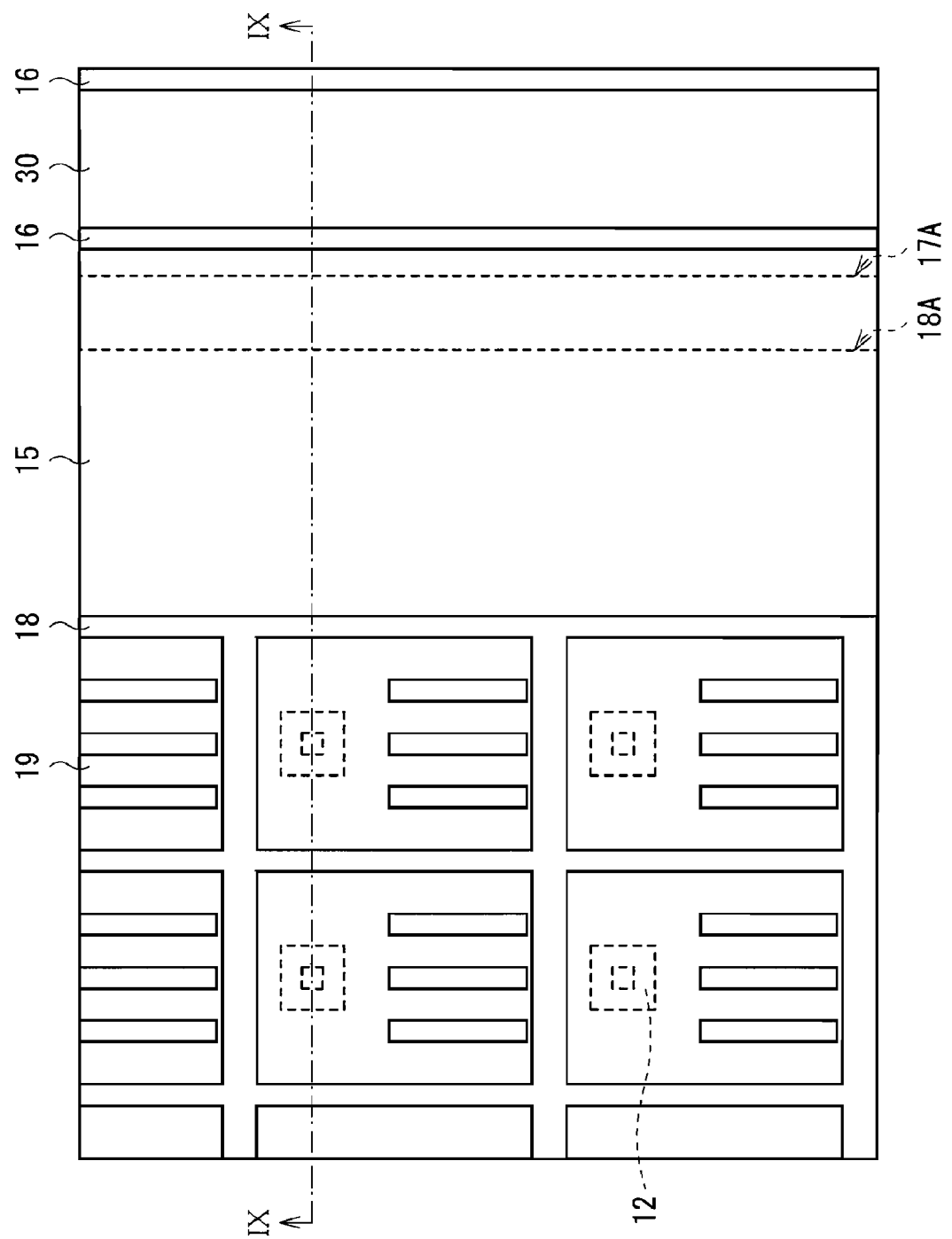
FIG. 8 is a plan view showing the configuration of a liquid crystal display panel in a third embodiment of the invention.
Figure 9:
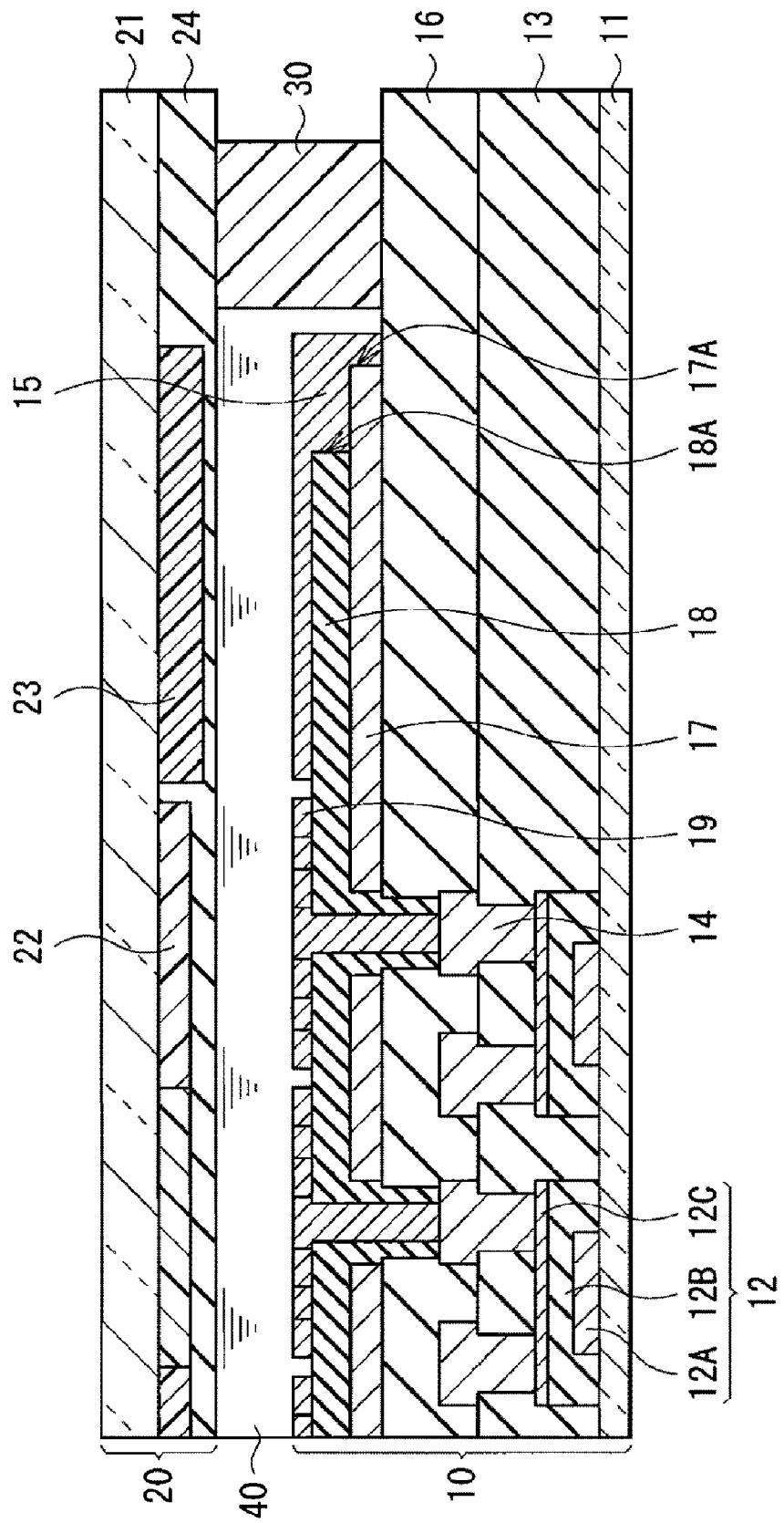
FIG. 9 is a cross section view taken along line IX-IX in FIG. 8.

FIG. 8 shows a plan configuration around an end of the liquid crystal display panel 1 as a third embodiment of the invention. FIG. 9 shows a sectional structure taken along line IX-IX in FIG. 8. The liquid crystal display panel 1 has a configuration similar to that of the first embodiment except that the end face 18A of the insulating film 18 and a part of the top face thereof continuing to the end face 18A are covered with the peripheral wiring 15. Therefore, the same reference numerals are designated to corresponding elements.

The glass substrate 11, the TFT 12, the protection film 13, the wiring 14, the planarization film 16, the opposite electrode 17, the insulating film 18, and the pixel electrode 19 are formed in a manner similar to the first embodiment.

The end face 18A of the insulating film 18 and a part of the top face thereof continuing to the end face 18A are covered with the peripheral wiring 15. The end face 18A of the insulating film 18 is positioned on the inside of the end face 17A of the opposite electrode 17 in a manner similar to the first embodiment. A part of the under face of the insulating film 18 continuing to the end face 18A is covered with the opposite electrode 17. With the configuration, in the display apparatus, in a manner similar to the first embodiment, destruction of the insulating film 18 and generation of air bubbles in the display apparatus by water or water vapor can be suppressed.

Preferably, the part covering the top face of the insulting film 18, of the peripheral wiring 15 has a length of 100 nm or more from the end face 18A of the insulating film 18 in a manner similar to the first embodiment.

Preferably, the peripheral wiring 15 is electrically connected to the opposite electrode 17 in a manner similar to the first embodiment.

The liquid crystal display panel 1 may be manufactured in a manner similar to the first embodiment except that the peripheral wiring 15 is formed at the time of forming the pixel electrode 19. The operation and effect of the embodiment are similar to that of the first embodiment. Further, by forming the peripheral wiring 15 of a metal having excellent adhesion to the opposite electrode 17, the operation and effect of the third embodiment are stabilized.

In the foregoing embodiment, the case where the peripheral wiring 15 contains aluminum and molybdenum as metal elements has been described. However, the peripheral wiring 15 may also contain another metal element. The opposite electrode 17 may also contain another metal element. A metal element contained in the peripheral wiring 15 or the opposite electrode 17 is at least one element selected from the group consisting of indium, tin, zinc, aluminum, molybdenum, titanium, tungsten, chromium, tantalum, and silver, for example.

Fourth Embodiment

Figure 10:
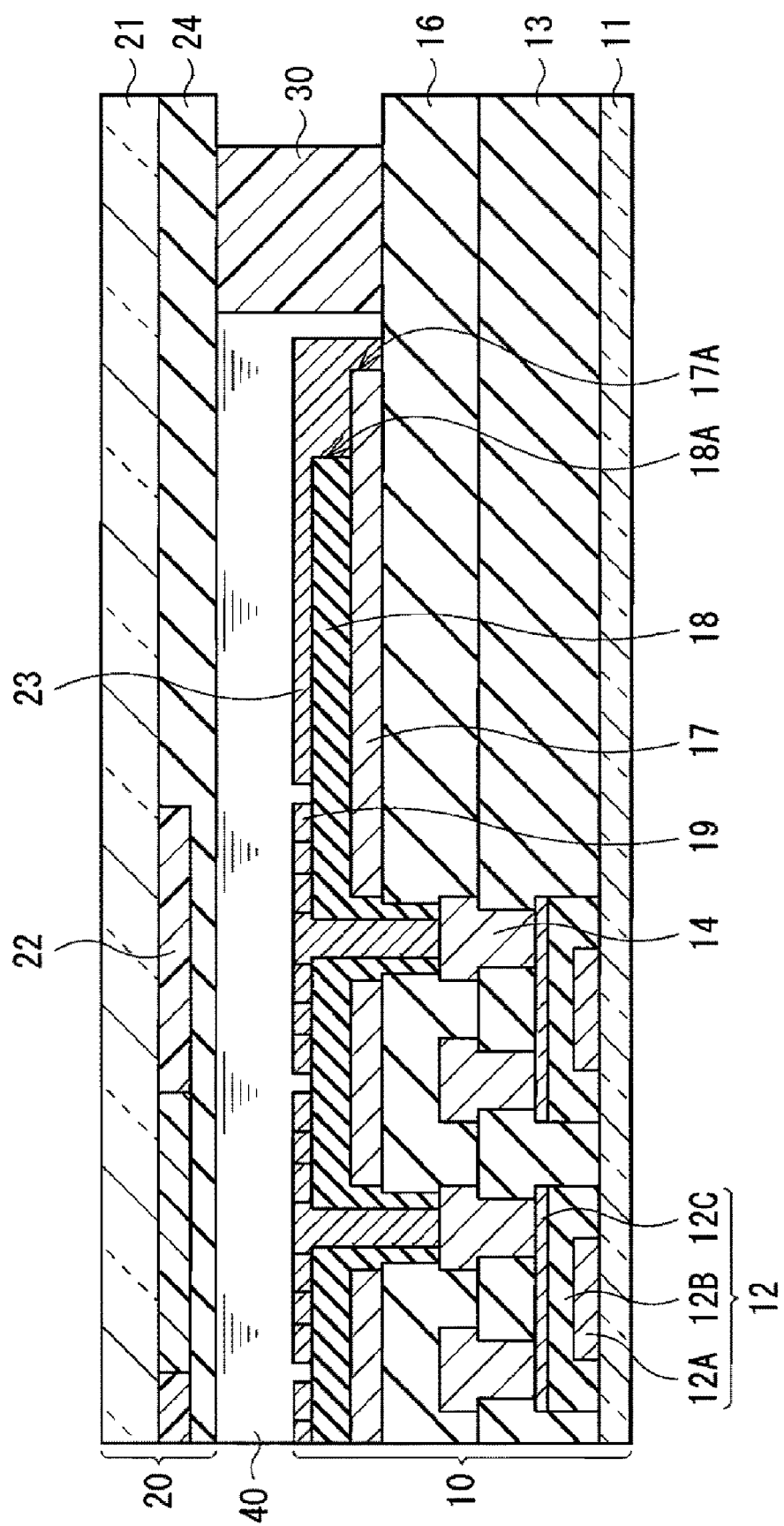
FIG. 10 is a cross section view showing the configuration of a liquid crystal display panel in a fourth embodiment of the invention.
Figure 11:
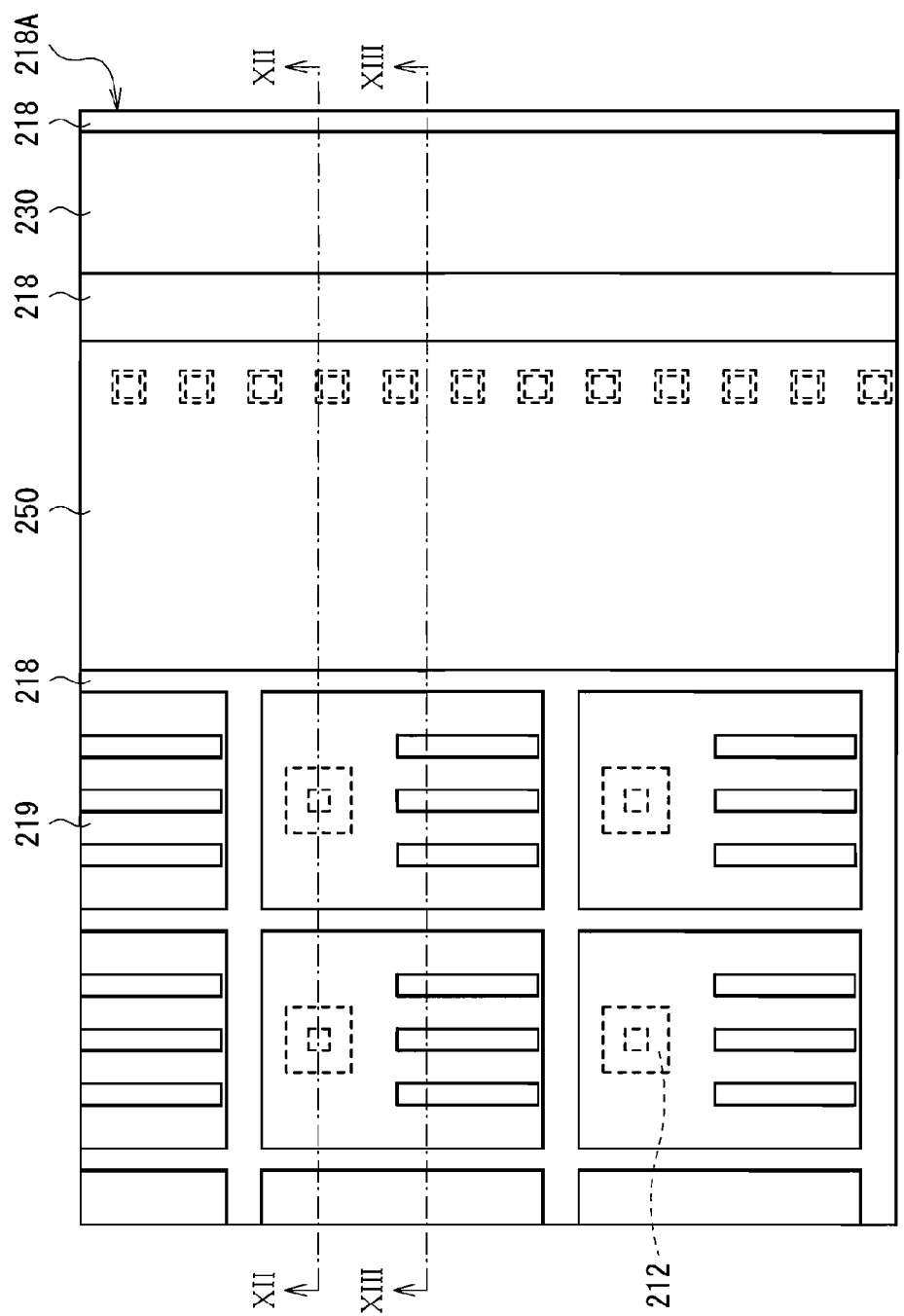
FIG. 11 is a plan view showing the configuration of a liquid crystal display panel of related art.
Figure 12:
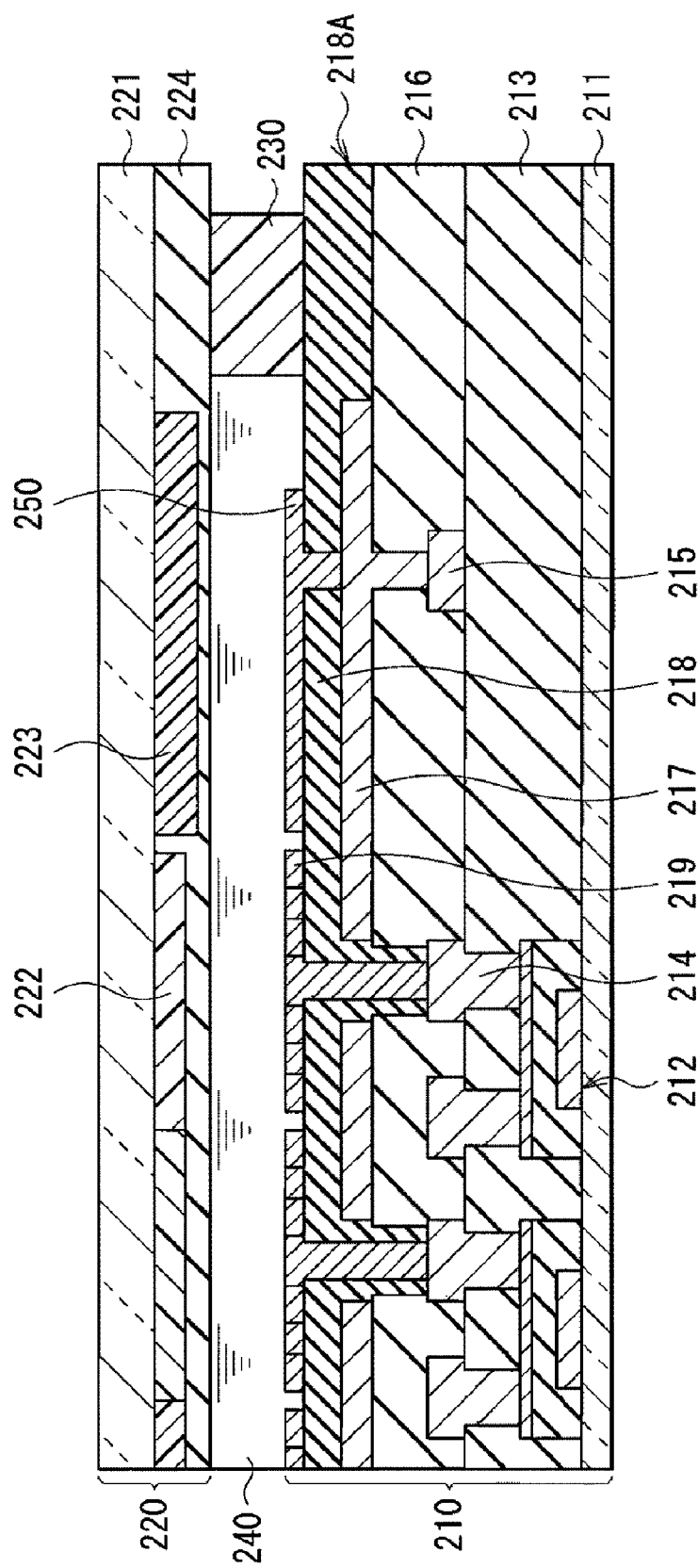
FIG. 12 is a cross section showing the configuration taken along line XI-XI in FIG. 11.
Figure 13:
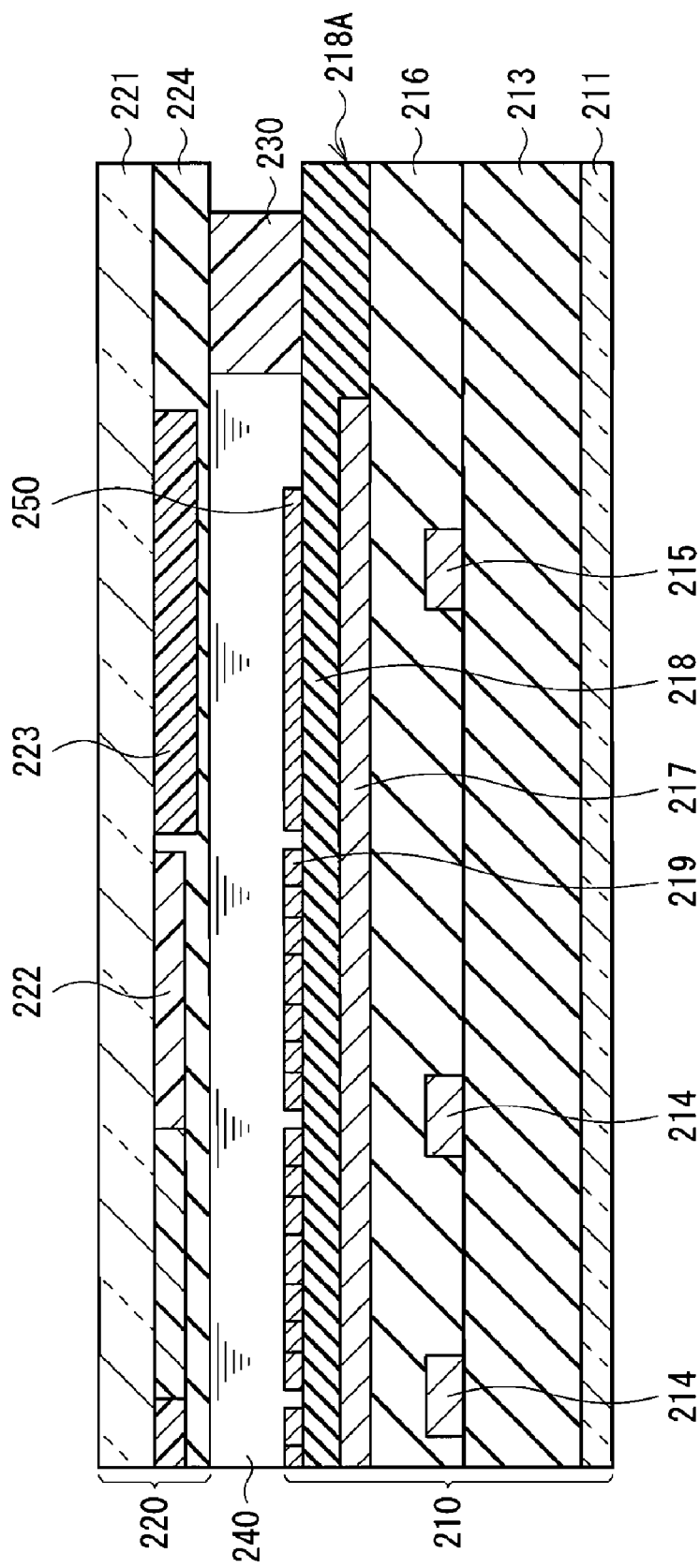
FIG. 13 is a cross section view showing the configuration taken along line XII-XII in FIG. 11.
Figure 14:
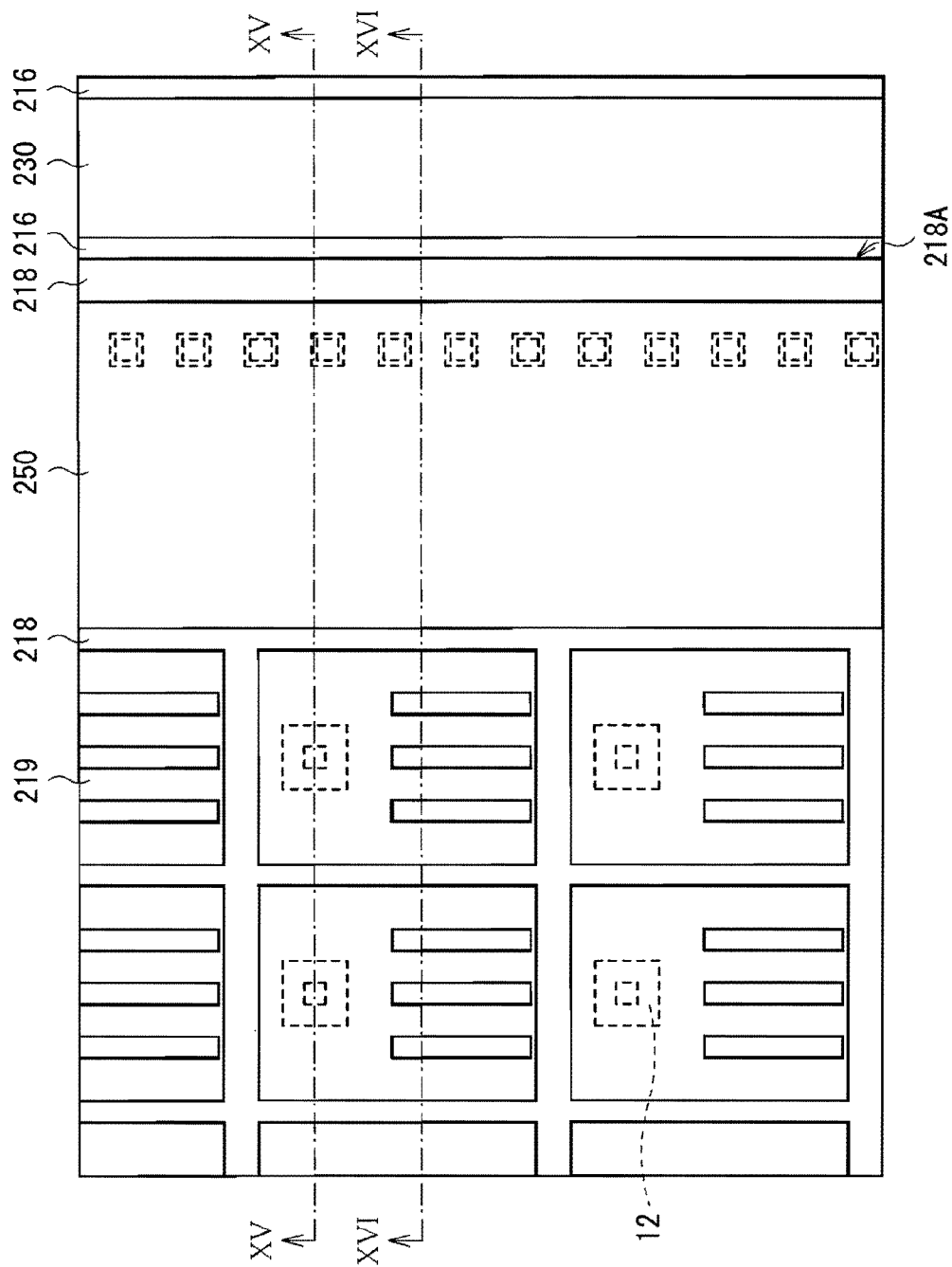
FIG. 14 is a plan view showing another configuration of the liquid crystal display panel of related art.
Figure 15:
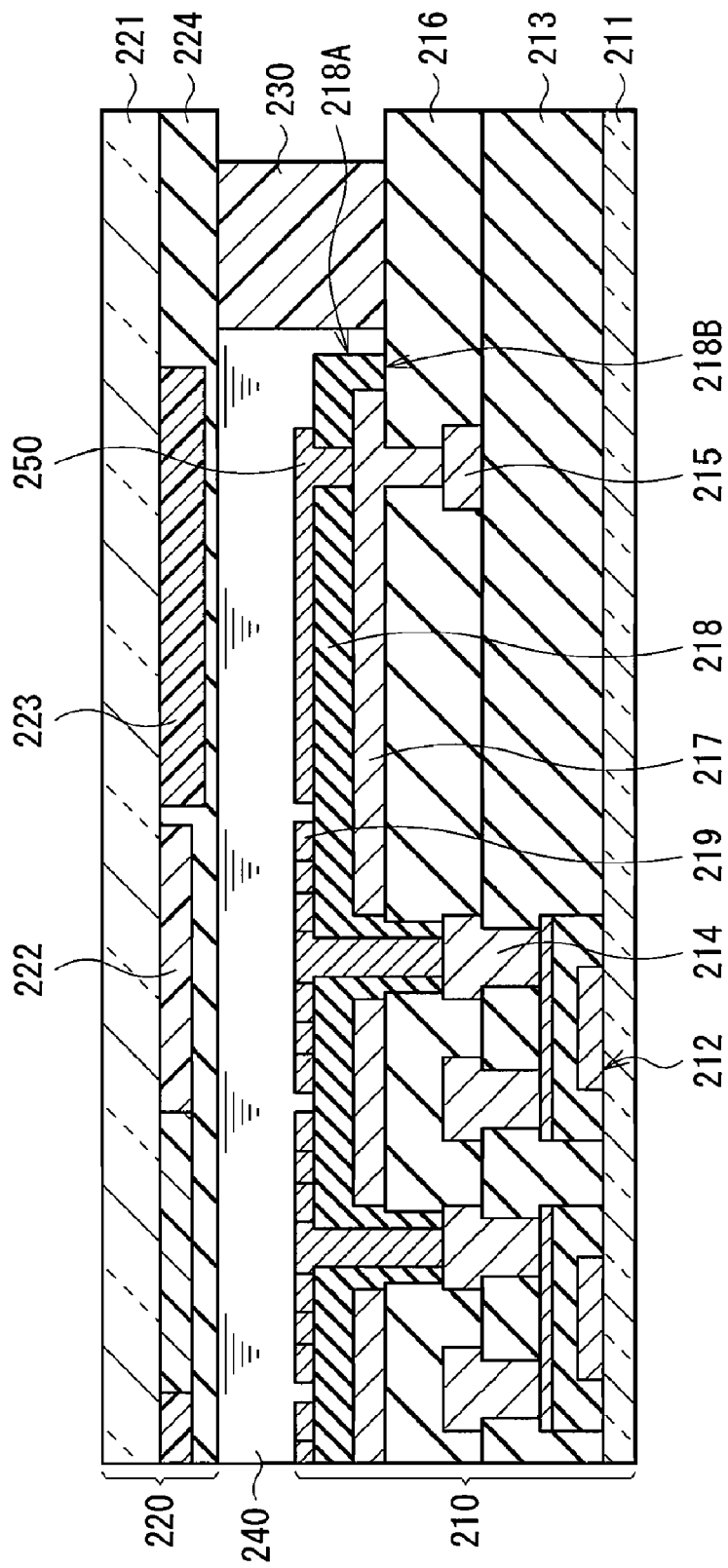
FIG. 15 is a cross section showing the configuration taken along line XV-XV in FIG. 14.
Figure 16:
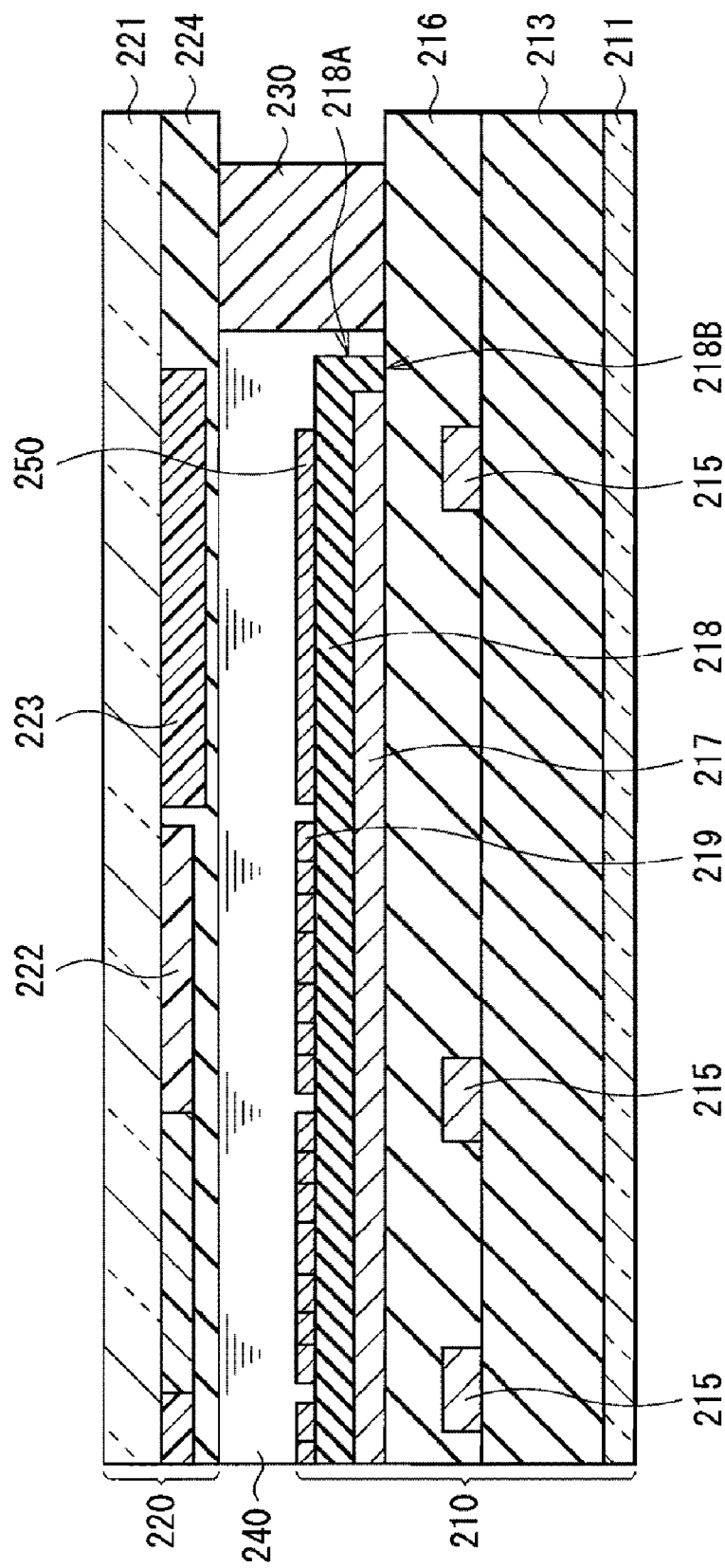
FIG. 16 is a cross section view showing the configuration taken along line XVI-XVI in FIG. 14.

FIG. 10 shows a cross sectional configuration of a portion around an end of the liquid crystal display panel 1 as a fourth embodiment of the invention. The liquid crystal display panel 1 has a configuration similar to that of the first embodiment except that the end face 18A of the insulating film 18 and a part of the top face thereof continuing to the end face 18A are covered with the peripheral light shield layer 23. Therefore, the same reference numerals are designated to corresponding elements.

The glass substrate 11, the TFT 12, the protection film 13, the wiring 14, the planarization film 16, the opposite electrode 17, the insulating film 18, and the pixel electrode 19 are formed in a manner similar to the first embodiment.

The end face 18A of the insulating film 18 and a part of the top face thereof continuing to the end face 18A are covered with the peripheral light shield layer 23. The peripheral light shield layer 23 is made of, for example, chromium oxide and contains chromium as a metal element. In a manner similar to the first embodiment, the end face 18A is positioned on the inside of the end face 17A of the opposite electrode 17, and a part of the under face of the insulating film 18 continuing to the end face 18A of the insulating film 18 is covered with the opposite electrode 17. With the configuration, in the display apparatus, in a manner similar to the first embodiment, destruction of the insulating film 18 in the display apparatus by water or water vapor and generation of air bubbles can be suppressed.

The peripheral light shield layer 23 also has the function of the peripheral wiring 15, so that the manufacturing process is also reduced.

Preferably, a part covering the top face of the insulating film 18, of the peripheral light shield layer 23 has a length of 100 nm or more from the end face 18A of the insulating film 18 in a manner similar to the first embodiment.

The liquid crystal display panel 1 may be manufactured in a manner similar to the first embodiment except that the pixel electrode 19 is formed and, after that, the peripheral light shield layer 23 made of the above-described material is formed. The effect of the embodiment is similar to that of the first embodiment.

In the embodiment, in addition to the effect of the first embodiment, the peripheral light shield layer 23 can be provided with the function of the peripheral wiring 15, so that the manufacture process can be reduced.

In the foregoing embodiment, the case where the peripheral light shield layer 23 contains chromium as a metal element has been described. The light shield layer 23 may contain another metal element. The opposite electrode 17 may also contain another metal element. A metal element contained in the peripheral light shield layer 23 or the opposite electrode 17 is at least one element selected from the group consisting of indium, tin, zinc, aluminum, molybdenum, titanium, tungsten, chromium, tantalum, and silver, for example.

Although the present invention has been described by the embodiments, the invention is not limited to the embodiments but may be variously modified. For example, in the foregoing embodiments, the configuration of the whole display apparatus and the liquid crystal display panel 1 has been concretely described. However, other configurations may be also employed. For example, the invention is also applicable to a liquid crystal display having a drive circuit made by a poly-silicon TFT using microcrystal, and similar effects are obtainable.

Further, for example, in the foregoing embodiment, the case of applying the present invention to the liquid crystal display has been described. The invention is also applicable to the case using another display element such as an organic electroluminescence (EL) or inorganic EL.

Obviously many modifications and variations of the present invention are possible in the light of the above teachings. It is therefore to be understood that within the scope of the appended claims the invention may be practiced otherwise than as specifically described.

What is claimed is:

1. A display apparatus comprising:
a display element having a display layer together with a pixel electrode and an opposite electrode;
an insulating film in contact with an under face of the pixel electrode; and
a metal-containing film that contains a metal element, covers an end face of the insulating film, and covers a part of a top face and a part of an under face which continue to the end face of the insulating film,
wherein,
the insulating film is provided between the pixel electrode and the opposite electrode and is in contact with the under face of the pixel electrode and the top face of the opposite electrode.

2. The display apparatus according to claim 1, wherein:
the display element is disposed in a display region on a substrate,
a seal layer is provided on the outside of the display region, and
the end face of the insulating film is positioned on the inside of the seal layer.

3. The display apparatus according to claim 2, wherein:
a peripheral wiring is provided between the display region and the seal layer, and
the peripheral wiring serves as a part covering the part of the under face of the insulating film, of the metal-containing film.

4. The display apparatus according to claim 1, wherein the metal-containing film is made of at least one element selected from the group consisting of indium, tin, zinc, aluminum, molybdenum, titanium, tungsten, chromium, tantalum, and silver.

5. A display apparatus comprising:
a display element having a display layer together with a pixel electrode and an opposite electrode;
an insulating film in contact with an under face of the pixel electrode; and
a metal-containing film that contains a metal element, covers an end face of the insulating film, and covers a part of a top face and a part of an under face which continue to the end face of the insulating film,
wherein,
the display element is disposed in a display region on a substrate,
a seal layer is provided on the outside of the display region,
the end face of the insulating film is positioned on the inside of the seal layer,
the end face of the insulating film lies on the inside of the end face of the opposite electrode, and
the opposite electrode serves as a part covering the part of the under face of the insulating film, of the metal-containing film.

6. The display apparatus according to claim 5, wherein:
a film is provided in the layer of the pixel electrode, and
the film serves as a part covering the end face and the part of the top face of the insulating film, of the metal-containing film.

7. The display apparatus according to claim 5, wherein:
a peripheral wiring is provided between the display region and the seal layer, and
the peripheral wiring serves as a part covering the end face and the part of the top face of the insulating film, of the metal-containing film.

8. The display apparatus according to claim 5, wherein:
a peripheral light shield layer is provided between the display region and the seal layer, and
the peripheral light shield layer serves as a part covering the end face of the insulating film and the part of the top face of the insulating film, of the metal-containing film.

9. A display apparatus comprising:
a display element having a display layer together with a pixel electrode and an opposite electrode;
an insulating film in contact with an under face of the pixel electrode; and
a metal-containing film that contains a metal element, covers an end face of the insulating film, and covers a part of a top face and a part of an under face which continue to the end face of the insulating film,
wherein,
a part covering each of the top and under faces of the insulating film, of the metal-containing film has a length of 100 nm or more from the end face of the insulating film.

* * * * *